United States Patent [19]

Gulya et al.

[11] Patent Number: 4,830,905

[45] Date of Patent: May 16, 1989

[54] PAPERMAKER'S FELT INCORPORATING A CLOSED CELL POLYMERIC FOAM LAYER

[75] Inventors: Thomas G. Gulya, Appleton; Gary V. Schultz, Kimberely, both of Wis.; Kenneth G. Staiger, Raleigh, N.C.

[73] Assignee: Appleton Mills, Appleton, Wis.

[21] Appl. No.: 234,794

[22] Filed: Aug. 22, 1988

[51] Int. Cl.$^4$ .............................................. B32B 5/02
[52] U.S. Cl. .................................. 428/234; 162/358; 162/DIG. 1; 428/280; 428/282; 428/300
[58] Field of Search .............. 428/280, 282, 234, 300; 162/358, DIG. 1

[56] References Cited

U.S. PATENT DOCUMENTS

| | | | |
|---|---|---|---|
| 3,059,312 | 10/1962 | Jamieson | 428/234 |
| 3,617,442 | 11/1971 | Hurschman | 162/212 |
| 3,772,746 | 11/1973 | Ivanowicz | 28/72.2 |
| 4,271,222 | 6/1981 | Hahn | 428/193 |
| 4,357,386 | 11/1982 | Luciano et al. | 428/234 |
| 4,369,081 | 1/1983 | Curry et al. | 428/234 |
| 4,469,740 | 9/1984 | Bailly | 428/234 |
| 4,701,368 | 10/1987 | Kiuchi et al. | 428/234 |

*Primary Examiner*—James J. Bell
*Attorney, Agent, or Firm*—Andrus, Sceales, Starke & Sawall

[57] ABSTRACT

A papermaker's felt having improved water extraction characteristics. The felt is composed of a base fabric, and a layer of a closed cell polymeric foam is disposed on a face of the base fabric. A batt of fibrous material is needled to the base fabric and foam layer. The needling operation penetrates the fibers of the batt into the foam layer, intersecting the cells. The resiliency of the foam tends to close the cell walls against the penetrated fibers so that under uncompressed conditions, the felt is substantially impervious. Under compressive forces, as occurs in the nip between press rolls, the interfaces between the penetrated fibers and the cell walls will open to enable water to be extracted through the felt.

7 Claims, No Drawings

PAPERMAKER'S FELT INCORPORATING A CLOSED CELL POLYMERIC FOAM LAYER

BACKGROUND OF THE INVENTION

Papermaker's felts are used in the press section of a papermaking machine to extract water from the wet paper web. The paper web is supported on the felt and passes through the nip between a pair of cooperating press rolls to extract water from the web. It is recognized that when the felt and supported paper web are released from the nip, the felt and paper will tend to expand to their original thickness and this expansion sets up hydraulic and capilliary forces, which tends to draw water from the felt back into the paper web, a phenomenon commonly referred to as "rewetting".

It has been proposed in the past to incorporate a layer of open cell polymeric foam as a component of a papermaker's felt. For example, U.S. Pat. No. 3,059,312, discloses a papermaker's felt composed of a base fabric, and a layer of an open cell polymeric foam sandwiched between the base fabric and an outer fibrous batt. The batt is then needled to the base fabric to provide the felt structure.

U.S. Pat. No. 3,617,442, is directed to a structure to be used as a papermaker's felt or a forming wire, in which the endless structure is composed solely of an open cell polymeric material. When used as a forming wire, the polymeric material can also be reinforced by internal machine direction yarns.

The prior felt constructions incorporating a polymeric foam layer, have utilized an open cell foam, in which the cells or pores are interconnected to provide a water permeable structure. Closed cell polymeric foam has not been recognized as a viable component in a papermaker's felt because the foam is substantially impervious to the flow of fluids. This is true even though open cell foam is considerably more expensive than closed cell foam due to the fact that open cell foam is produced by costly chemical and/or mechanical reticulating processes.

SUMMARY OF THE INVENTION

The invention is directed to a papermaker's felt composed of a layer of closed cell polymeric foam in combination with a fibrous material which is needled to the foam layer to cause the fibers to penetrate into, and be interwined with, the foam layer. In a preferred form of the invention, the felt includes a base fabric, preferably formed of woven natural or synthetic fibers, which supports the closed cell polymeric foam layer. A batt, of fibrous material is needled to the foam layer and base fabric.

The closed cell polymeric foam, before assembly in the felt structure, has a density in the range of 1.0 to 6.0 lbs per cubic foot, a thickness of 50 to 500 mils, a rigidity in the range of 35-150 IFD (Internal Force Deflection) and an air permeability porosity of 10 to 130 cubic feet per square feet of fabric per minute.

The needled felt has 3500 to 5500 needle penetrations per square inch and has an air permeability in the range of 10 to 150 cubic feet per square foot of fabric per minute.

The closed cell foam, such as polyurethane foam, is composed of a multiplicity of isolated, closed cells. During fabrication of the closed cell foam material, and subsequent handling, some of the cell walls may be ruptured. However, the foam material, before being incorporated into the felt structure, has a very low air permeability During the needling process, the fibers of the batt are penetrated into the foam material, in a uniform pattern so that the penetrated fibers intersect the cells and rupture the cell walls. However, due to the resiliency of the foam material, the foam will close upon the penetrated fibers so that the resulting felt structure, under static or uncompressed conditions will have a low air permeability.

In use, when the felt carrying the wet paper web passes through the nip between cooperating press rolls, water is extracted from the paper web and the compressive force will open the interfaces between the penetrated fibers and the foam to permit the water to be discharged through the felt structure. On release from the nip, the felt and paper web will expand, and the resiliency of the foam will close off the interfaces between the penetrated fibers and the cell walls to trap water in the cells and resist the hydraulic and capillary forces tending to draw water back into the paper web, thereby minimizing rewetting of the paper web.

As a further advantage, the needled felt of the invention has a more uniform permeability throughout its area than a conventional felt, thereby resulting in more uniform water extraction characteristics.

Other objects and advantages will appear in the course of the following description.

DESCRIPTION OF THE PREFERRED EMBODIMENT

The papermakers felt of the invention comprises a base fabric, a layer of closed cell polymeric material, and a batt of fibrous material which is needled to the base fabric and foam layer.

The base fabric is preferably a woven material formed of machine direction yarns and cross yarns. The machine direction and cross yarns can be formed of monofiliments, multifiliments, or staple yarns and consist of synthetic or natural fibers or mixtures thereof.

The fibrous batt comprises a mass of synthetic or natural fibers.

The closed cell foam layer can be formed from a material, such as polyurethane, and prior to its assembly in the felt structure has a density of 1.0 to 6.0 lbs per cubic foot, a thickness of 50 to 500 mils and a rigidity of 35-150 IFD (Internal Force Deflection) and an air permeability of 10 to 130 cubic feet per square foot of fabric per minute as determined by the standard air permeability test procedure ASTM-D-737-46.

The foam layer has a multiplicity of small isolated cells. However, the chemical reactions that form the foam cells may result in some cell walls being broken, and in handling the foam, i.e. foam peeling and rolling, additional cell walls may be broken so that in practice the foam layer will have a very low air permeability within the above mentioned range, but the permeability will not be uniform throughout its area due to the cell rupturing occurring at isolated locations.

The needling operation is conventional and acts to penetrate the fibers of the batt into the foam layer and base fabric. The needled felt will contain in the range of 3500 to 5500 needle penetrations per inch.

The base fabric can either be produced in endless form or can be a pin seamed fabric in which the ends the base fabric are provided with a plurality of interdigitated loops which are connected by a removable pin or pintle.

In the preferred form of the invention, the foam layer is disposed on a surface of the endless base fabric. The composite endless structure, consisting of the base fabric and the foam layer, is then placed in a conventional needling machine and the fibrous batt material is needled into the foam and base layer.

While the above description has described a construction in which the foam layer is sandwiched between the base fabric and the fibrous batt, the relationship of the components is not critical. In other applications, fibrous batts may be needled into both faces of the felt structure or the batt can be sandwiched between the foam layer and the base layer. In further applications the foam layer may be sandwiched between a pair of base fabrics and batts needled to one or both faces of the structure.

In the past, open cell polymeric foam has been incorporated in papermakers felt. However, open cell foam is considerably more expensive to produce than closed cell foam in that the polymeric foam is formed in a closed cell condition and it is then necessary to reticulate the closed cell construction, either by chemical or mechanical processes, to provide the open cell construction. Therefore, even though closed cell foam is considerably less expensive than open cell foam, it was heretofore believed that closed cell foam was not a viable component for a papermakers felt due to its imperious nature. Quite unexpectedly, it has been discovered through the invention that the more inexpensive closed cell foam can be incorporated into a felt structure and will provide the necessary permeability for the felt. In the needling operation, the needles break the cell walls and drive the fibers into the foam structure. The resiliency of the polymeric material acts to close the cell walls against the penetrated fibers so that under static, uncompressed conditions the imperious nature of the foam is retained after needling. However, under dynamic conditions as the felt passes through the nip between the press rolls, the compressive force of the nip will open the interfaces between the cell walls and the penetrated fibers to enable water to be driven through the felt. After the felt passes through the nip, the foam will expand to its original condition in which the interfaces are substantially closed, thereby trapping water in the cells and minimizing the amount of water being drawn by hydraulic and capillary forces back to the paper web. Thus, the needled closed cell foam layer acts as a one-way valve, permitting the flow of water from the paper web under compressive conditions, but substantially preventing the flow of water back to the paper web under non-compressive conditions.

Moreover, the needling operation provides more uniform water extraction characteristics for the felt throughout its length so that the paper web is dried more uniformly.

Various modes of carrying out the invention are contemplated as being within the scope of this patent. The following claims particularly point out and distinctly claim the subject matter which is regarded as the invention.

We claim:

1. A papermakers felt, comprising a layer of closed cell resilient polymeric foam containing a multiplicity of isolated cells, and a fibrous material needled to said foam layer and including a multiplicity of fibers penetrated into said foam layer and intersecting said cells.

2. The felt of claim 1, wherein said foam prior to needling has a density of 1.0 to 6.0 lbs per cubic foot, a thickness of 50 to 500 mils, a rigidity of 35 to 150 IFD and an air permeability of 10 to 130 cubic feet per square foot of fabric per minute.

3. The felt of claim 1, wherein said felt has an air permeability of 10 to 150 cubic feet per square foot of fabric per minute.

4. The felt of claim 1, wherein said needled felt contains 3500 to 5500 needle penetrations per inch.

5. A papermakers felt, comprising a layer of closed cell polymeric foam containing a multiplicity of isolated cells, a base fabric, and a fibrous batt needled to said foam layer and to said base fabric to provide a felt structure, said needled felt structure having from 3500 to 5500 needle penetrations per inch.

6. A papermakers felt, comprising a layer of closed cell polymeric foam containing a multiplicity of non-connected cells bordered by cell walls, and a multiplicity of randomly oriented fibers penetrated into said foam layer and intersecting said cell walls, said foam layer prior to penetration of said fibers having a density in the range of 1.0 to 6.0 lbs per cubic foot, a thickness of 50 to 500 mils, a rigidity of 35 to 150 IFD, and an air permeability of 10 to 130 to cubic feet per square foot of fabric per minute.

7. The felt of claim 6, wherein the interfaces between said foam and the penetrated fibers under non-compressed conditions of said felt are in substantially sealed relation to substantially prevent liquid flow through said foam layer, and said interfaces under compressed conditions of said felt are opened to permit liquid flow through said foam layer.

* * * * *